United States Patent
Wang et al.

(10) Patent No.: US 10,284,710 B2
(45) Date of Patent: *May 7, 2019

(54) CALL METHOD OF MOBILE TERMINAL, MOBILE TERMINAL CONTROL METHOD, AND RELATED DEVICE

(71) Applicant: Huawei Device (Dongguan) Co., Ltd., Dongguan, Guangdong (CN)

(72) Inventors: Chan Wang, Shenzhen (CN); Huangwei Wu, Shenzhen (CN)

(73) Assignee: Huawei Device (Dongguan) Co., Ltd., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/728,359

(22) Filed: Oct. 9, 2017

(65) Prior Publication Data
US 2018/0034955 A1 Feb. 1, 2018

Related U.S. Application Data

(63) Continuation of application No. 14/943,966, filed on Nov. 17, 2015, now Pat. No. 9,813,548, which is a (Continued)

(30) Foreign Application Priority Data

Jun. 29, 2013 (CN) .......................... 2013 1 0270818

(51) Int. Cl.
H04M 9/00 (2006.01)
H04M 1/725 (2006.01)
(Continued)

(52) U.S. Cl.
CPC ....... *H04M 1/72577* (2013.01); *H04M 1/663* (2013.01); *H04M 3/02* (2013.01); (Continued)

(58) Field of Classification Search
CPC .... H04M 1/72577; H04M 1/663; H04M 3/02; H04M 3/436; H04M 2201/14; (Continued)

(56) References Cited

U.S. PATENT DOCUMENTS 8,385,884 B1 2/2013 Hertzfeld et al.
9,813,548 B2* 11/2017 Wang .................... H04M 1/663
(Continued)

FOREIGN PATENT DOCUMENTS

CN 1589047 A 3/2005
CN 101001282 A 7/2007
(Continued)

*Primary Examiner* — Barry W Taylor

(57) ABSTRACT

The present application discloses a mobile terminal control method, including: receiving a communication request sent by a communication request initiating party, and calculating a time interval between a time when the communication request is received and a time when a previous communication request from the communication request initiating party is received; and if the time interval is greater than a preset threshold, skipping generating a vibrating and/or ringtone alert for the communication request, and detecting an online status of a communications software account associated with the communication request initiating party and sending prompt information to an online communications software account, where the prompt information is used to indicate that a mobile terminal is in a Do Not Disturb mode.

14 Claims, 7 Drawing Sheets

Related U.S. Application Data continuation of application No. PCT/CN2014/080670, filed on Jun. 25, 2014.

(51) Int. Cl.
*H04M 1/663* (2006.01)
*H04M 3/436* (2006.01)
*H04M 3/02* (2006.01)
*H04M 3/42* (2006.01)

(52) U.S. Cl.
CPC ........ *H04M 3/436* (2013.01); *H04M 3/42093* (2013.01); *H04M 2201/14* (2013.01); *H04M 2203/2005* (2013.01); *H04M 2250/60* (2013.01)

(58) Field of Classification Search
CPC ..... H04M 2203/2005; H04M 2250/60; H04M 3/42374; H04M 3/42093; H04M 1/725577; H04M 2203/205
See application file for complete search history.

(56) References Cited

U.S. PATENT DOCUMENTS

| | | | | |
|---|---|---|---|---|
| 2001/0031633 A1* | 10/2001 | Tuomela | ............... | H04M 1/663 455/417 |
| 2009/0010406 A1* | 1/2009 | Miller | ............... | H04L 29/06027 379/93.23 |
| 2010/0099398 A1* | 4/2010 | Bauchot | ............. | G06K 7/10079 455/422.1 |
| 2012/0180135 A1 | 7/2012 | Hodges et al. | | |
| 2014/0171132 A1* | 6/2014 | Ziemianska | .......... | H04M 3/436 455/466 |
| 2016/0072943 A1 | 3/2016 | Wang et al. | | |

FOREIGN PATENT DOCUMENTS

| | | | |
|---|---|---|---|
| CN | 101472009 | A | 7/2009 |
| CN | 101720138 | A | 6/2010 |
| CN | 101938575 | A | 1/2011 |
| CN | 101945167 | A | 1/2011 |
| CN | 102917321 | A | 2/2013 |
| CN | 102957781 | A | 3/2013 |
| CN | 103338308 | A | 10/2013 |
| EP | 0783219 | A2 | 7/1997 |
| EP | 1324580 | A2 | 7/2003 |
| KR | 10-2005-0013848 | A | 2/2005 |
| KR | 10-2006-0072777 | A | 6/2006 |

* cited by examiner

CALL METHOD OF MOBILE TERMINAL, MOBILE TERMINAL CONTROL METHOD, AND RELATED DEVICE

CROSS-REFERENCE TO RELATED APPLICATIONS

This application is a continuation of U.S. patent application Ser. No. 14/943,966, filed on Nov. 17, 2015, which is a continuation of International Application No. PCT/CN2014/080670, filed on Jun. 25, 2014, which claims priority to Chinese Patent Application No. 201310270818.0, filed on Jun. 29, 2013. All of the aforementioned applications are hereby incorporated by reference in their entireties.

TECHNICAL FIELD

The present invention relates to the communications field, and in particular, to a call method of a mobile terminal, a mobile terminal control method, and a related device.

BACKGROUND

Currently, the development of technologies has resulted in an increasing quantity of functions of a mobile terminal such as a mobile phone, and also resulted in an increasingly high intelligent degree of the mobile terminal. People can use a mobile phone to call or send an SMS message to another user, can also use functions inherent on a mobile phone, such as camera, calculator, radio, memorandum and ebook functions, and can further use a mobile phone to surf the Internet, watch movies, play games, search for useful information, and so on. Popularity of mobile terminals such as mobile phones provides great convenience for people's work and life. Users can use these mobile terminals at any time to communicate with others to discuss some important things. However, in some cases, these mobile terminals may also bring some troubles to the users. For example, a user expects neither to be disturbed with unimportant incoming calls nor to miss important incoming calls during sleep at night or during breaks in other time periods. Because, in reality, there are usually some unimportant calls, even some nuisance calls, during these periods of time, and consequently, the user cannot have a good rest.

In the prior art, a solution provided for this scenario is that: a Do Not Disturb mode is set on a mobile phone; after a user activates the Do Not Disturb mode, the mobile phone may generate no sound or vibrating alert when receiving a communication request such as a push message, an SMS message, or an incoming call; in addition, a call request of a repeat call can bypass the Do Not Disturb mode according to settings. However, in this case, a communication request initiating party does not know that the called party has activated the Do Not Disturb mode; and in a case in which when the communication request initiating party first calls the called party but cannot get through, the communication request initiating party then sends an SMS message to the called party, the called party cannot be alerted because the mobile phone is in the Do Not Disturb mode, and in this case, if the communication request initiating party has something urgent, the called party may miss important information.

SUMMARY

The present invention is to provide a call method of a mobile terminal, a mobile terminal control method, and a related device, which can solve a deficiency in the prior art that important information from a communication request initiating party is missed after a Do Not Disturb mode is activated on a mobile terminal.

To solve the foregoing technical problem, a first aspect of the present invention provides a mobile terminal control method, including:

receiving a communication request sent by a communication request initiating party, and calculating a time interval between a time when the communication request is received and a time when a previous communication request from the communication request initiating party is received; and if the time interval is greater than a preset threshold, skipping generating a vibrating and/or ringtone alert for the communication request, and detecting an online status of a communications software account associated with the communication request initiating party and sending prompt information to an online communications software account, where the prompt information is used to indicate that the mobile terminal is in a Do Not Disturb mode.

In a first possible implementation manner, the step of detecting an online status of a communications software account associated with the communication request initiating party and sending prompt information to an online communications software account includes:

searching, according to a preset mapping relationship, for a communications software account corresponding to the communication request initiating party.

With reference to the first possible implementation manner, in a second possible implementation manner, the step of detecting an online status of a communications software account associated with the communication request initiating party and sending prompt information to an online communications software account includes:

detecting an online status and a preset priority of each communications software account if the communication request initiating party is corresponding to multiple communications software accounts; and sending the prompt information to a communications software account that is in an online state and has a highest priority.

With reference to the second possible implementation manner of the first aspect, in a third possible implementation manner, the method further includes:

if the time interval is less than the preset threshold, proceeding to determine whether the communication request is an incoming call request; and if yes, generating a vibrating and/or ringtone alert; if not, skipping generating a vibrating and/or ringtone alert.

With reference to any one of the first aspect to the third possible implementation manner, in a fourth possible implementation manner, the communication request is specifically:

any one of an incoming call request, an SMS message request, an instant message request, an email information request, and a push information request.

A second aspect of the present invention provides a call method of a mobile terminal, including:

initiating a call request to a mobile terminal of a called party; and when it is detected that the mobile terminal of the called party rejects the call request, sending a communication message to a communications software account that is in an online state and associated with the called party, so that the mobile terminal of the called party generates a vibrating and/or ringtone alert according to the communication message.

In a first possible implementation manner, the step of when it is detected that the mobile terminal of the called party rejects the call request, sending a communication message to a communications software account that is in an online state and associated with the called party includes:

searching, according to a preset mapping relationship, for a communications software account corresponding to the called party;

detecting an online status and a preset priority of each communications software account if the called party is corresponding to multiple communications software accounts; and sending prompt information to a communications software account that is in an online state and has a highest priority.

With reference to first possible implementation manner of the second aspect, in a second possible implementation manner, before the step of initiating a call request to a mobile terminal of a called party, the method further includes:

presetting content of the communication message.

With reference to any one of the second aspect to the second possible implementation manner, the communication message includes:

an instant message, an SMS message, an email, or push information.

A third aspect of the present invention provides a mobile terminal control apparatus, including:

a calculating module, configured to receive a communication request sent by a communication request initiating party, and calculate a time interval between a time when the communication request is received and a time when a previous communication request from the communication request initiating party is received; and an alerting module, configured to: if the time interval is greater than a preset threshold, skip generating a vibrating and/or ringtone alert for the communication request, and detect an online status of a communications software account associated with the communication request initiating party and send prompt information to an online communications software account, where the prompt information is used to indicate that the mobile terminal is in a Do Not Disturb mode.

In a first possible implementation manner, the alerting module includes:

a first searching unit, configured to search, according to a preset mapping relationship, for a communications software account corresponding to the communication request initiating party;

a first detection unit, configured to detect an online status and a preset priority of each communications software account if the communication request initiating party is corresponding to multiple communications software accounts; and a first sending unit, configured to send the prompt information to a communications software account that is in an online state and has a highest priority.

With reference to the first possible implementation manner of the second aspect, in a second possible implementation manner, the apparatus further includes: a filtering module, configured to: if the time interval is less than the preset threshold, proceed to determine whether the communication request is an incoming call request; and if yes, generate a vibrating and/or ringtone alert; if not, skip generating a vibrating and/or ringtone alert.

With reference to any one of the second aspect to the second possible implementation manner, in a third possible implementation manner, the communication request is specifically:

any one of an incoming call request, an SMS message request, an instant message request, an email information request, and a push information request.

A fourth aspect of the present invention provides a mobile terminal, including any apparatus according to the foregoing third aspect.

A fifth aspect of the present invention provides a call apparatus of a mobile terminal, including:

an incoming call request module, configured to initiate a call request to a mobile terminal of a called party; and a message sending module, configured to: when it is detected that the mobile terminal of the called party rejects the call request, send a communication message to a communications software account that is in an online state and associated with the called party, so that the mobile terminal of the called party generates a vibrating and/or ringtone alert according to the communication message.

In a first possible implementation manner, the message sending module includes:

a second searching unit, configured to search, according to a preset mapping relationship, for a communications software account corresponding to the called party;

a second detection unit, configured to detect an online status and a preset priority of each communications software account if the called party is corresponding to multiple communications software accounts; and a second sending unit, configured to send prompt information to a communications software account that is in an online state and has a highest priority.

With reference to the first possible implementation manner of the fifth aspect, in a second possible implementation manner, the apparatus further includes:

a content configuration module, configured to preset content of the communication message.

With reference to fifth aspect to the second possible implementation manner of the fifth aspect, in a third possible implementation manner, the communication message includes:

an instant message, an SMS message, an email, or push information.

A sixth aspect of the present invention provides a mobile terminal, including any call apparatus according to the foregoing fifth aspect.

The following beneficial effects are brought by implementing the present invention:

A Do Not Disturb mode on a mobile terminal is set and activated, a time interval between a current communication time and a previous communication time of a communication request initiating party is calculated, and whether the time interval is less than a preset threshold is determined according to the time interval. If yes, the Do Not Disturb mode set on the mobile terminal is bypassed, and a vibrating and/or ringtone alert is generated; if not, the mobile terminal is prohibited from generating a vibrating and/or ringtone alert, and prompt information is sent to a communications software account that is in an online state and corresponding to the communication request initiating party, to notify the communication request initiating party that the Do Not Disturb mode is activated on the mobile terminal. In this way, a problem in the prior art that important information from a communication request initiating party is missed after a Do Not Disturb mode is activated on a mobile terminal can be effectively solved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
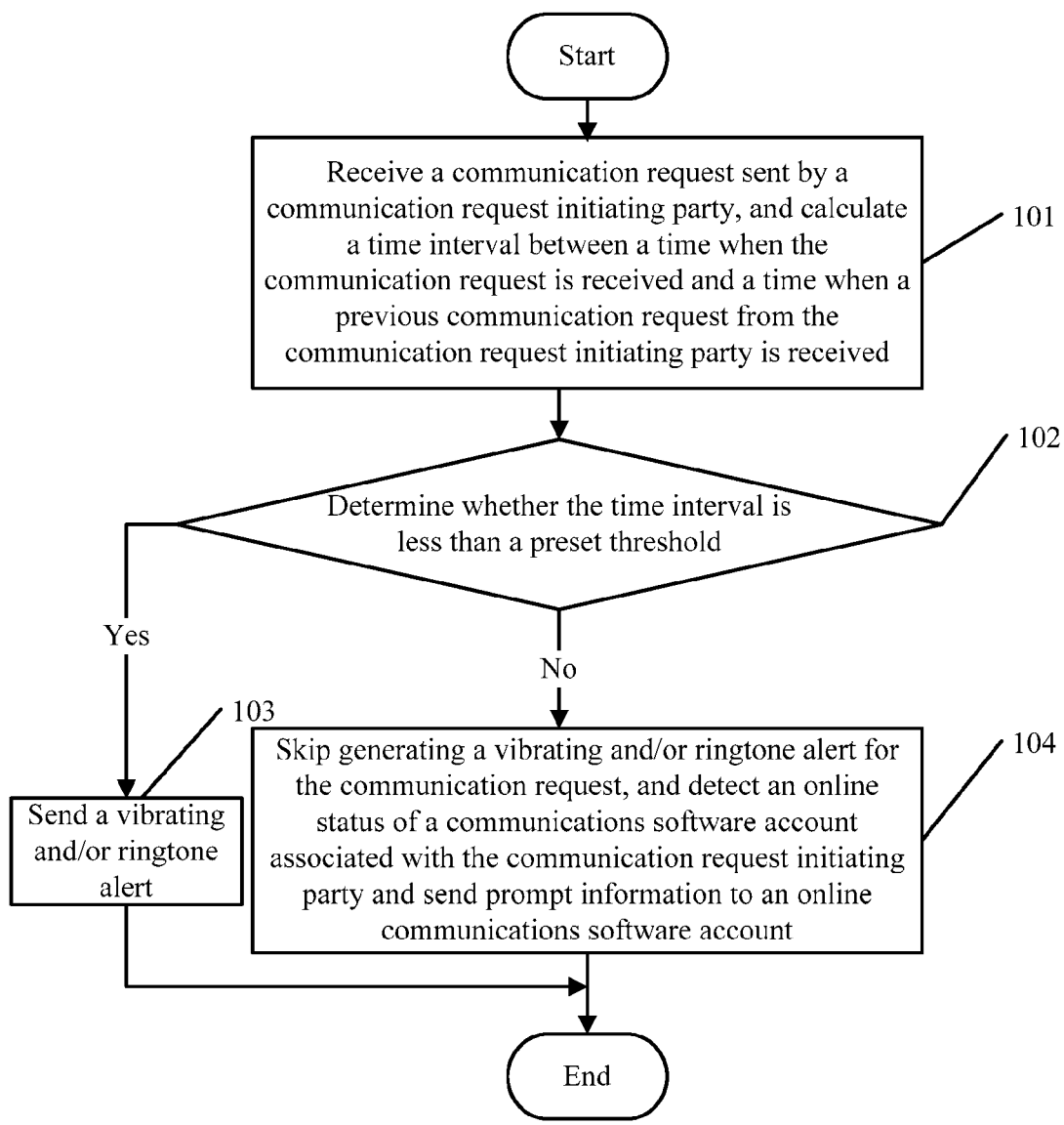
FIG. 1 is a schematic flowchart of a mobile terminal control method according to an embodiment of the present invention.

Referring to FIG. 1, FIG. 1 is a schematic flowchart of a mobile terminal control method according to an embodiment of the present invention, and the method includes:

Step 101: Receive a communication request sent by a communication request initiating party, and calculate a time interval between a time when the communication request is received and a time when a previous communication request from the communication request initiating party is received.

Specifically, a Do Not Disturb mode is activated and a Do Not Disturb time period is set on a mobile terminal in advance. After the Do Not Disturb mode is activated and the Do Not Disturb time period is set, when receiving a communication request within the Do Not Disturb time period, the mobile terminal calculates the time interval between the time when the previous communication request from the communication request initiator is received and the time when the current communication request is received.

Assuming that the Do Not Disturb time period set on the mobile terminal is 23:00-7:00, and that the time when the current communication request initiated by the communication request initiator is received is 5:00 and the time when the previous communication request initiated by the communication request initiator is received is 4:55, both of which fall within the preset Do Not Disturb time period, the time interval between the time of the current communication request and the time of the previous communication request is five minutes. If the communication request initiating party initiates the current communication request for the first time, the time of the previous communication request initiated by the communication request initiating party is initialized to an infinitesimal value. In this case, the time interval between the time of the current communication request and the time of the previous communication request is infinite.

In this embodiment of the present invention, the communication request received by the mobile terminal may be an SMS message request, an incoming call request, an email request, a push message request, an instant message request, or the like; the current communication request and the previous communication request may be the same or may be different, for example, the current communication request is an instant message request and the previous communication request is an incoming call request, which is not limited herein and is not restricted to a manner in the prior art in which a Do Not Disturb mode set on the mobile terminal can be bypassed only by an incoming call request, thereby reducing a possibility that important information from a communication request initiating party is missed.

Step 102: Determine whether the time interval is less than a preset threshold.

Specifically, whether the time interval calculated in step 101 is less than the preset threshold is determined. If the time interval is less than the preset threshold, step 103 is executed; otherwise, step 104 is executed.

Step 103: Generate a vibrating and/or ringtone alert.

Step 104: Skip generating a vibrating and/or ringtone alert for the communication request, and detect an online status of a communications software account associated with the communication request initiating party and send prompt information to an online communications software account.

Specifically, the mobile terminal skips generating a vibrating and/or ringtone alert, and detects whether the communications software account associated with the communication request initiating party is in an online state. If yes, the mobile terminal sends the prompt information to the communications software account, where the prompt information is locally prestored by the mobile terminal, and is automatically sent by the mobile terminal when the foregoing trigger condition is met, and the prompt information includes information that the Do Not Disturb mode is activated on the mobile terminal and includes a threshold set on the mobile terminal. For example, the prompt information is "Do Not Disturb mode activated. If there is anything urgent, please make a second request within three minutes". In this way, the communication request initiating party may determine, according to the prompt information, whether to initiate a communication request again; for the mobile terminal, unnecessary nuisances can be reduced.

By implementing this embodiment of the present invention, a Do Not Disturb mode is set and activated on a mobile terminal, a time interval between a current communication time and a previous communication time of a communication request initiating party is calculated, and whether the time interval is less than a preset threshold is determined according to the time interval. If yes, the Do Not Disturb mode set on the mobile terminal is bypassed, and a vibrating and/or ringtone alert is generated; if not, the mobile terminal is prohibited from generating a vibrating and/or ringtone alert, and prompt information is sent to a communications software account that is in an online state and corresponding to the communication request initiating party, to notify the communication request initiating party that the Do Not Disturb mode is activated on the mobile terminal. In this way, a problem in the prior art that important information from a communication request initiating party is missed after a Do Not Disturb mode is activated on a mobile terminal can be effectively solved.

Figure 2:
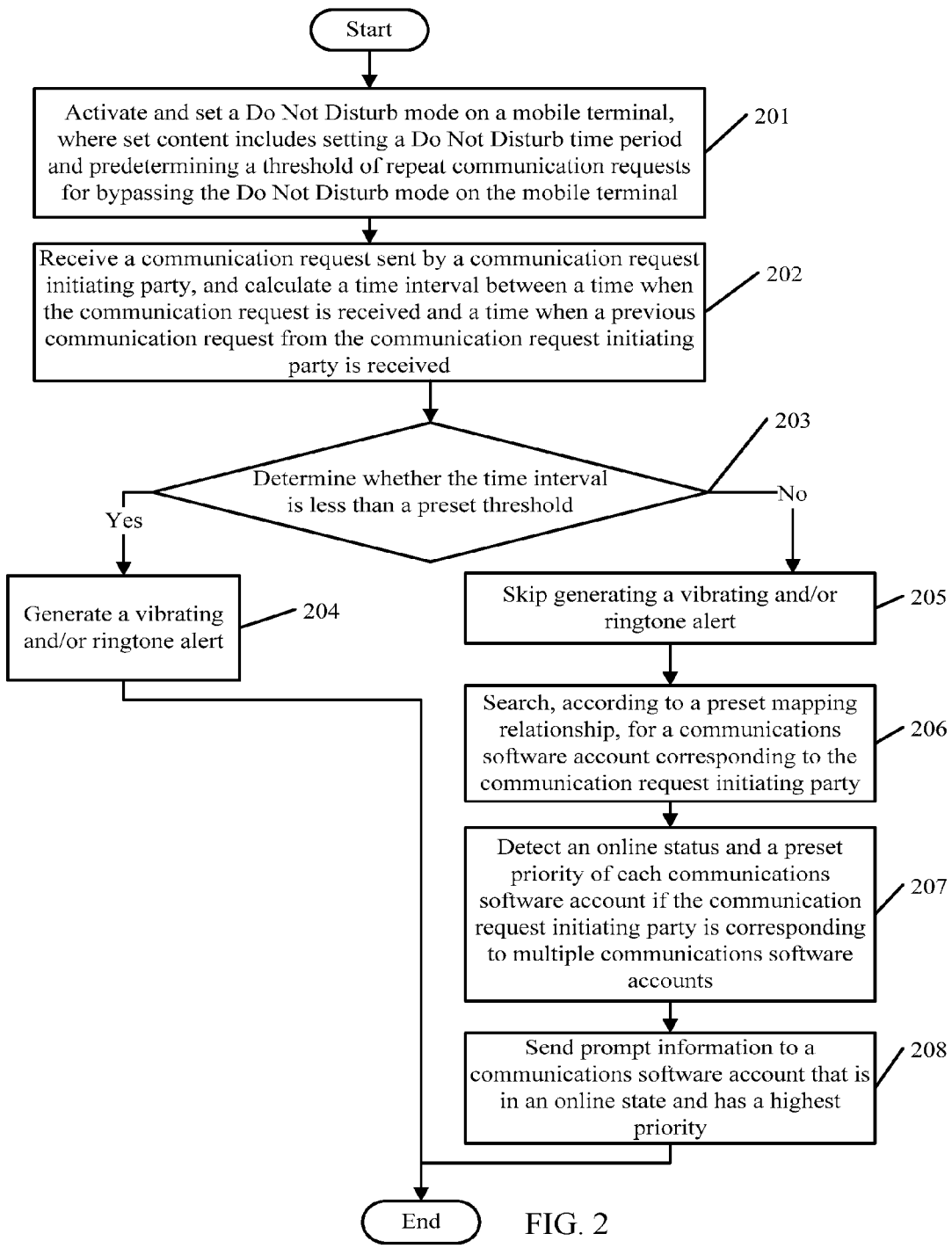
FIG. 2 is another schematic flowchart of a mobile terminal control method according to an embodiment of the present invention.

Referring to FIG. 2, FIG. 2 is another schematic flowchart of a method for optimizing a Do Not Disturb mode of a mobile terminal according to an embodiment of the present invention, and the method includes:

Step 201: Activate and set a Do Not Disturb mode on a mobile terminal, where set content includes a Do Not Disturb time period and a threshold of repeat communication requests for bypassing the Do Not Disturb mode on the mobile terminal.

Specifically, the Do Not Disturb mode on the mobile terminal is activated and set, and the set content includes setting the Do Not Disturb time period and the threshold. It is assumed that the set Do Not Disturb time period is 23:00-7:00, and the threshold is three minutes; in addition, a personal favorites list may further be set on the mobile terminal, where a contact in the list is a contact that can bypass the Do Not Disturb mode.

Step 202: Receive a communication request sent by a communication request initiating party, and calculate a time interval between a time when the communication request is received and a time when a previous communication request from the communication request initiating party is received.

Specifically, if a personal favorites list is set on the mobile terminal, the communication request initiating party herein is a contact that is not in the personal favorites list. Assuming that the time when the communication request is received by the mobile terminal is 5:00, the time of the current communication request falls within the Do Not Disturb time period set in step 201, and a time interval between a time of the previous communication request and a time of the current communication request initiated by the communication request initiating party is calculated. Assuming that the time of the previous communication request initiated by the communication request initiating party is 4:48, the time interval, obtained through calculation, between the time of the previous communication request and the time of the current communication request from the communication request initiating party is two minutes. If the communication request initiating party initiates the current communication request for the first time, the time of the previous communication request initiated by the communication request initiating party is initialized to be an infinitesimal value, and the time interval, obtained through calculation, between the time of the current communication request and the time of the previous communication request is infinite.

Communication types of a current communication request and a previous communication request may be the same or may be different. When communication types of the two communication requests are different, whether communication request initiating parties are a same person is determined according to a preset mapping relationship. Specifically, a contact in the mapping relationship is associated with several communications software accounts, for example, Tom is associated with a telephone number, a Facebook account, a Twitter account, an email account, and the like. Assuming that the current communication request received by the mobile terminal is a WeChat message, and the previous communication request is an incoming call request, the preset mapping relationship is searched to determine whether a Twitter account of the WeChat message and a telephone number of the incoming call request belong to the same user Tom.

Step 203: Determine whether the time interval is less than a preset threshold.

Specifically, whether the time interval is less than the threshold preset in step 201 is determined according to the time interval calculated in step 202. If yes, step 204 is executed; otherwise, step 205 is executed. In the example in step 202, the calculated time interval is two minutes, and the preset threshold is three minutes; in this case, step 204 is executed.

Step 204: Generate a vibrating and/or ringtone alert.

Step 205: Skip generating a vibrating and/or ringtone alert.

Specifically, when a result of the determining in step 203 is no, the mobile terminal stays in a mute state.

Step 206: Search, according to a preset mapping relationship, for a communications software account corresponding to the communication request initiating party.

Specifically, the preset mapping relationship is specifically: Assuming that, in the mapping relationship, communications software accounts associated with the communication request initiating party Tom are a telephone number, a QQ account, a Twitter account, an email account, and an iMessage account, and that a priority of each communications software account is also preset, and assuming that the priority of the iMessage account is highest, when a communication type of the current communication request is an incoming call request, it is obtained, through searching according to the mapping relationship, that corresponding communications software accounts are the QQ account, the Twitter account, and the iMessage account.

Step 207: Detect an online status and a preset priority of each communications software account if the communication request initiating party is corresponding to multiple communications software accounts.

Specifically, in an example of the communications software accounts obtained through searching in step 206, the communication request initiating party is corresponding to three communications software accounts, an online status of each communications software account is detected, and a priority of each communications software account in an online state is acquired. It is assumed that the QQ account, the Twitter account, and the iMessage account in this example are all online.

Step 208: Send prompt information to a communications software account that is in an online state and has a highest priority.

Specifically, the prompt information is sent to the iMessage account, where the prompt information includes a message indicating that the Do Not Disturb mode is activated on the mobile terminal and includes a set threshold. For example, the prompt information is "It is the Do Not Disturb time now. If there is something urgent, please make a second call within three minutes". After receiving the prompt information, the communication request initiating party may determine, according to whether it is urgent, whether to initiate a communication request to a called party again (that is, the mobile terminal) again, which can effectively reduce a communication nuisance to the mobile terminal and reduce missed important communication information.

Further preferably, the mobile terminal determines, according to the communication type of the current communication request, whether the current communication request is an incoming call request. If yes, the mobile terminal proceeds to determine whether a request time of the incoming call request is greater than a preset time; if not, the mobile terminal is prohibited from generating a vibrating and/or ringtone alert. When the request time of the incoming call request is greater than the preset time, the mobile terminal generates a vibrating and/or ringtone alert; otherwise, the mobile terminal is prohibited from generating a vibrating and/or ringtone alert.

Specifically, the incoming call request of the current communication request is identified, and the request time of the incoming call request is also determined. The vibrating and/or ringtone alert is generated only when the current communication request is an incoming call request and the request time of the incoming call request is greater than the preset time, which can effectively reduce a quantity of times that a user of the mobile terminal is disturbed with other spam messages.

When the current communication request is not an incoming call request, for example, the request is an SMS message request, an email request, a Push information request, an instant message request, or the like, or when the request time of the incoming call request is less than the preset time, no vibrating and/or ringtone alert is generated.

By implementing this embodiment of the present invention, a Do Not Disturb mode is set and activated on a mobile terminal, a time interval between a current communication time and a previous communication time of a communication request initiating party is calculated, and whether the time interval is less than a preset threshold is determined according to the time interval. If yes, the Do Not Disturb mode set on the mobile terminal is bypassed, and a vibrating and/or ringtone alert is generated; if not, the mobile terminal is prohibited from generating a vibrating and/or ringtone alert, and prompt information is sent to a communications software account that is in an online state and corresponding to the communication request initiating party, to notify the communication request initiating party that the Do Not Disturb mode is activated on the mobile terminal. In this way, a problem in the prior art that important information from a communication request initiating party is missed after a Do Not Disturb mode is activated on a mobile terminal can be effectively solved.

Figure 3:
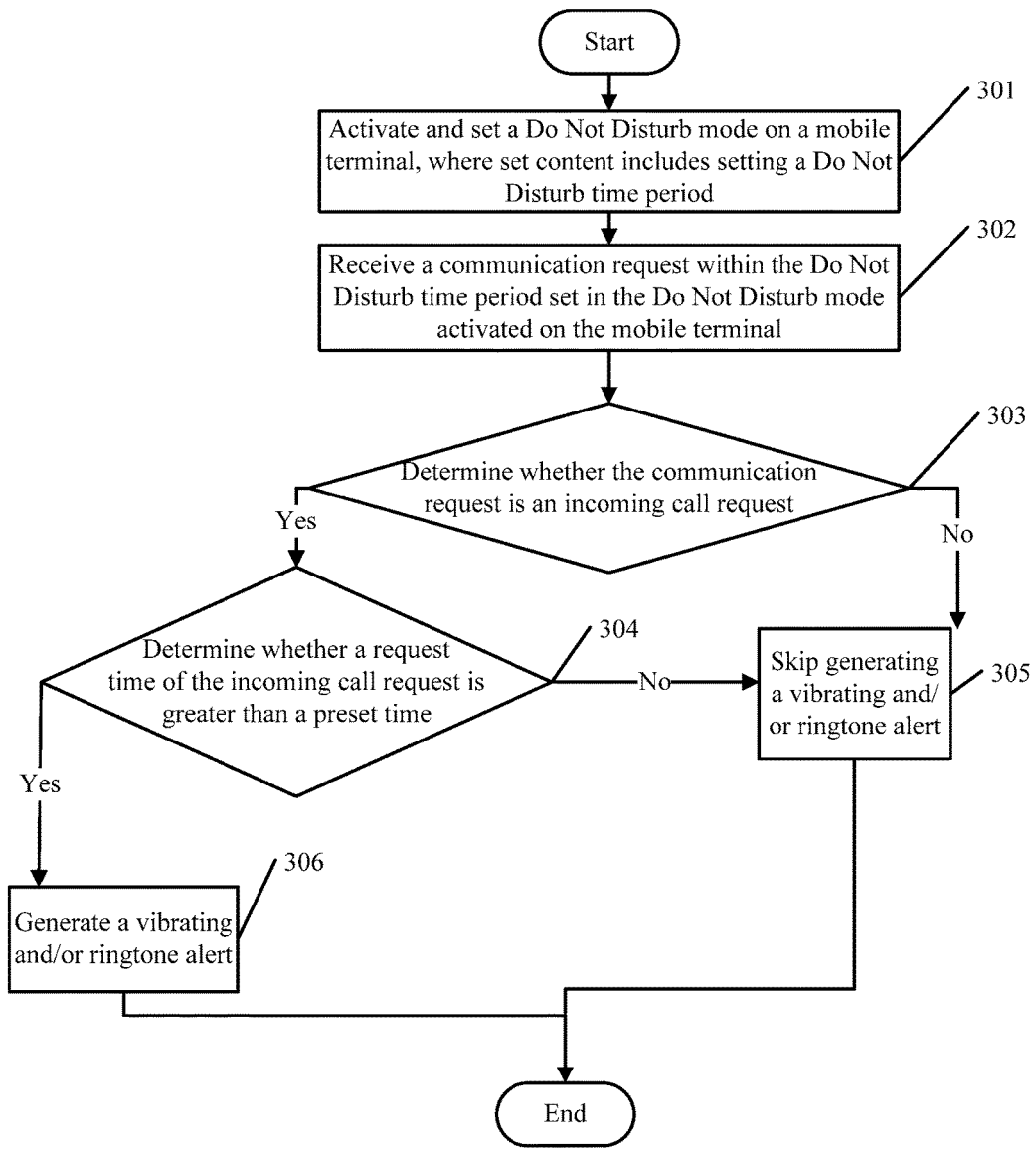
FIG. 3 is still another schematic flowchart of a mobile terminal control method according to an embodiment of the present invention.

Referring to FIG. 3, FIG. 3 is still another schematic flowchart of a method for optimizing a Do Not Disturb mode of a mobile terminal according to an embodiment of the present invention, and the method includes:

Step 301: Activate and set a Do Not Disturb mode on a mobile terminal, where set content includes setting a Do Not Disturb time period.

Step 302: Receive a communication request during the Do Not Disturb time period set in the Do Not Disturb mode activated on the mobile terminal.

Step 303: Determine whether the communication request is an incoming call request.

Specifically, a communication request received by a mobile terminal may be an incoming call request, an SMS message request, an instant message request, an email request, or the like. The mobile terminal identifies, according to a type of the received communication request, whether the communication request is an incoming call request. If yes, step 304 is executed; otherwise, step 305 is executed.

Step 304: Determine whether a request time of the incoming call request is greater than a preset time.

Specifically, whether the request time of the incoming call request identified in step 303 is greater than the preset time is determined. Assuming that the preset time is 30 seconds, the mobile terminal determines whether the request time of the incoming call request is greater than 30 seconds. If yes, step 306 is executed; otherwise, step 305 is executed.

Step 305: Skip generating a vibrating and/or ringtone alert.

Specifically, when the communication request is not an incoming call request or the request time of the incoming call request is less than a preset time, the mobile terminal stays in a mute state. In this case, nuisances from a communication request that is not an incoming call and from calls such as those ringing only once can be effectively avoided.

Step 306: Generate a vibrating and/or ringtone alert.

Figure 4:
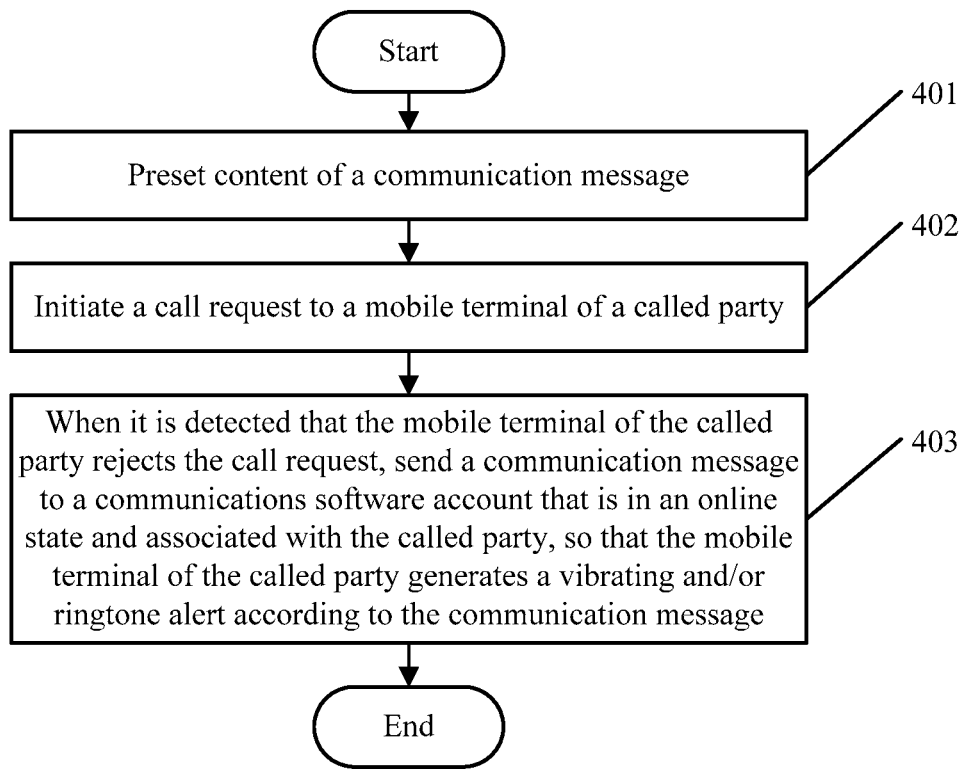
FIG. 4 is a schematic flowchart of a call method of a mobile terminal according to an embodiment of the present invention.

Referring to FIG. 4, FIG. 4 is a call method of a mobile terminal according to an embodiment of the present invention, and the method includes:

Step 401: Preset content of a communication message.

Specifically, a user may prestore the content of the communication message in a mobile terminal of a calling party as required. For example, the set content may be "You are urgently needed, and your phone just called is not answered".

Step 402: Initiate a call request to a mobile terminal of a called party.

Specifically, the mobile terminal of the calling party initiates the call request to the mobile terminal, on which a Do Not Disturb mode is preset, of the called party, and the call request is initiated within a Do Not Disturb time period and, in addition, is initiated by the calling party for the first time.

Step 403: When it is detected that the mobile terminal of the called party rejects the call request, send the communication message to a communications software account that is in an online state and associated with the called party, so that the mobile terminal of the called party generate a vibrating and/or ringtone alert according to the communication message.

Specifically, according to settings of the Do Not Disturb mode on the mobile terminal of the called party, the call request is not answered. When detecting that the call request is not answered, the mobile terminal of the calling party sends the communication message to the communications software account that is in an online state and associated with the called party. A specific process may be that: the mobile terminal of the calling party detects an online status of the communications software account associated with the called party. For example, a mobile phone number of the called party Tom is 138XXXXXXXX, and a communications software account associated with the mobile phone number is a QQ account, an email account, or an iMessage account, where each account is preset with a priority. The mobile terminal of the calling party detects the online status of the communications software account associated with the called party, where a non-instant communications software account may be considered to be always in an online state; acquires a priority of each communications software account that is in an online state; and sends the communication message set in step 401 to a communications software account that is in an online state and has a highest priority.

The communication message may also not be preset. When it is detected that the mobile terminal of the called party does not answer a call request, a page for formulating a communication message is provided, and the user formulates a communication message and sends the communication message to the communications software account associated with the called party.

After receiving the communication message, the mobile terminal of the called party determines whether the received call request and the received communication message are sent by a same user. If yes, the mobile terminal determines whether a time interval between two communication requests is less than a preset threshold, for example, the threshold is three minutes. If yes, the Do Not Disturb mode set on the mobile terminal of the called party is bypassed, and a vibrating and/or ringtone alert is generated.

Figure 5:
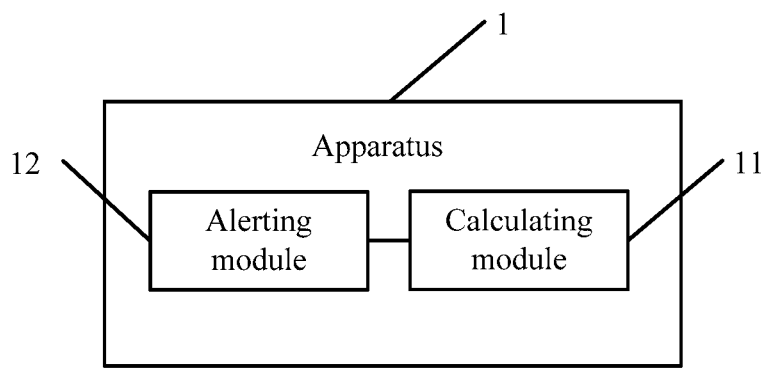
FIG. 5 is a schematic structural diagram of a mobile terminal control apparatus according to an embodiment of the present invention.

Referring to FIG. 5, FIG. 5 is a schematic structural diagram of a mobile terminal control apparatus according to an embodiment of the present invention, where the mobile terminal control apparatus is hereinafter referred to as an apparatus 1. The apparatus 1 includes a calculating module 11 and an alerting module 12.

The calculating module 11 is configured to receive a communication request sent by a communication request initiating party, and calculate a time interval between a time when the communication request is received and a time when a previous communication request from the communication request initiating party is received.

Specifically, a Do Not Disturb mode is activated and a Do Not Disturb time period is set on a mobile terminal in advance. After the Do Not Disturb mode is activated and the Do Not Disturb time period is set, when receiving a communication request within the Do Not Disturb time period, the calculating module 11 calculates a time interval between a time of the previous communication request and a time of the current communication request of the communication request initiating party. Assuming that the Do Not Disturb time period set on the mobile terminal is 23:00-7:00, and that the time of the current communication request initiated by the communication request initiating party is 5:00 and the time of the previous communication request initiated by the communication request initiating party is 4:55, both of which fall within the preset Do Not Disturb time period, the time interval, obtained by the calculating module 11 through calculation, between the time of the current communication request and the time of the previous communication request is five minutes. If the communication request initiating party initiates the current communication request for the first time, the time of the previous communication request initiated by the communication request initiating party is initialized to an infinitesimal value. In this case, the time interval, obtained by the calculating module 11 through calculation, between the time of the current communication request and the time of the previous communication request is infinite.

In this embodiment of the present invention, the communication request received by the calculating module 11 may be an SMS message request, an incoming call request, an email request, a push message request, an instant message request, or the like; the current communication request and the previous communication request may be the same or may be different, for example, the current communication request is an instant message request and the previous communication request is an incoming call request, which are not limited herein.

The alerting module 12 is configured to: if the time interval is greater than a preset threshold, skip generating a vibrating and/or ringtone alert for the communication request, and detect an online status of a communications software account associated with the communication request initiating party and send prompt information to an online communications software account, where the prompt information is used to indicate that the mobile terminal is in a Do Not Disturb mode.

By implementing this embodiment of the present invention, a Do Not Disturb mode is set and activated on a mobile terminal, a time interval between a current communication time and a previous communication time of a communication request initiating party is calculated, and whether the time interval is less than a preset threshold is determined according to the time interval. If yes, the Do Not Disturb mode set on the mobile terminal is bypassed, and a vibrating and/or ringtone alert is generated; if not, the mobile terminal is prohibited from generating a vibrating and/or ringtone alert, and prompt information is sent to a communications software account that is in an online state and corresponding to the communication request initiating party, to notify the communication request initiating party that the Do Not Disturb mode is activated on the mobile terminal. In this way, a problem in the prior art that important information from a communication request initiating party is missed after a Do Not Disturb mode is activated on a mobile terminal can be effectively solved.

Figure 6:
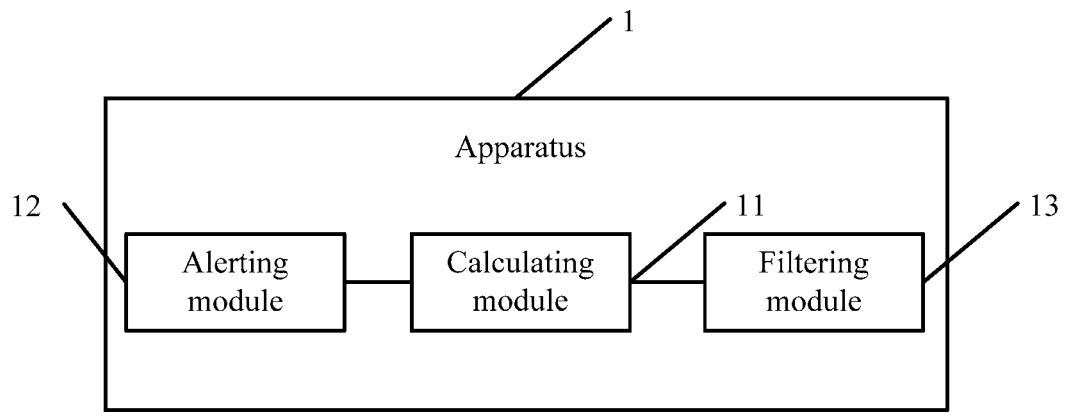
FIG. 6 is another schematic structural diagram of a mobile terminal control apparatus according to an embodiment of the present invention.
Figure 7:
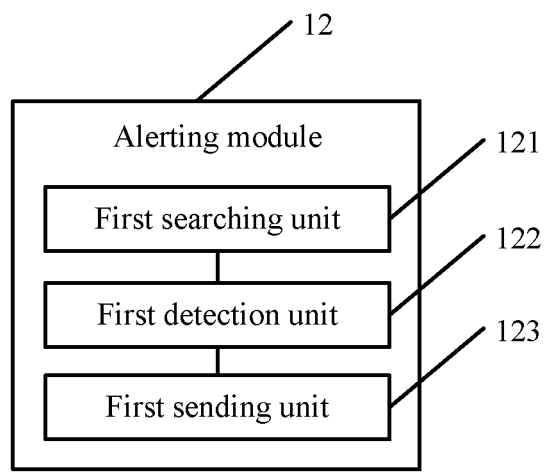
FIG. 7 is a schematic structural diagram of an alerting module in FIG. 6.

Further, referring to FIG. 6 and FIG. 7, FIG. 6 and FIG. 7 are other schematic structural diagrams of a mobile terminal control apparatus according to an embodiment of the present invention. In addition to the calculating module 11 and the alerting module 12, the apparatus 1 further includes a filtering module 13.

The filtering module 13 is configured to: if the time interval is less than the preset threshold, proceed to determine whether the communication request is an incoming call request; and if yes, generate a vibrating and/or ringtone alert; if not, skip generating a vibrating and/or ringtone alert.

Further preferably, in some embodiments of the present invention, the alerting module 12 includes a first searching unit 121, a first detection unit 122, and a first sending unit 123.

The first searching unit 121 is configured to search, according to a preset mapping relationship, for a communications software account corresponding to the communication request initiating party.

The first detection unit 122 is configured to detect an online status and a preset priority of each communications software account if the communication request initiating party is corresponding to multiple communications software accounts.

The first sending unit 123 is configured to send the prompt information to a communications software account that is in an online state and has a highest priority.

By implementing this embodiment of the present invention, a Do Not Disturb mode is set and activated on a mobile terminal, a time interval between a current communication time and a previous communication time of a communication initiating party is calculated, and whether the time interval is less than a preset threshold is determined according to the time interval. If yes, the Do Not Disturb mode set on the mobile terminal is bypassed, and a vibrating and/or ringtone alert is generated; if not, the mobile terminal is prohibited from generating a vibrating and/or ringtone alert, and prompt information is sent to a communications software account that is in an online state and corresponding to the communication request initiating party, to notify the communication request initiating party that the Do Not Disturb mode is activated on the mobile terminal. In this way, a problem in the prior art that important information from a communication request initiating party is missed after a Do Not Disturb mode is activated on a mobile terminal can be effectively solved.

Figure 8:
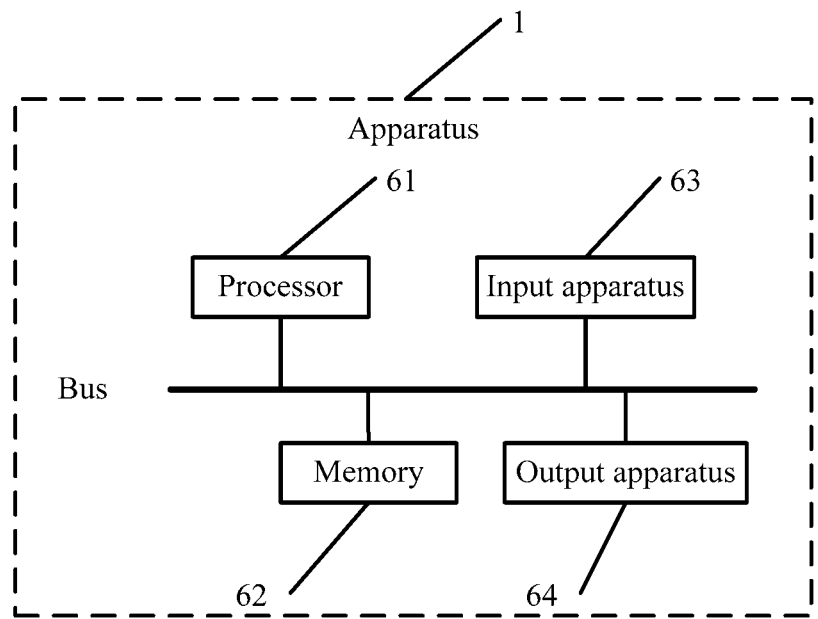
FIG. 8 is still another schematic structural diagram of a mobile terminal control apparatus according to an embodiment of the present invention.

Referring to FIG. 8, FIG. 8 is still another schematic structural diagram of a mobile terminal control apparatus according to an embodiment of the present invention. An apparatus 1 includes a processor 61, a memory 62, an input apparatus 63, and an output apparatus 64. A quantity of the processors 61 in the apparatus 1 may be one or multiple, and in FIG. 8, one processor is used as an example. In some embodiments of the present invention, the processor 61, the memory 62, the input apparatus 63, and the output apparatus 64 may be connected by using a bus or in another manner, and in FIG. 8, a bus is used as an example for connection.

The memory 62 stores a set of program code, and the processor 61 is configured to invoke the program code stored in the memory 62, and configured to execute the following operations:

receiving a communication request sent by a communication request initiating party, and calculating a time interval between a time when the communication request is received and a time when a previous communication request from the communication request initiating party is received; and if the time interval is greater than a preset threshold, skipping generating a vibrating and/or ringtone alert for the communication request, and detecting an online status of a communications software account associated with the communication request initiating party and sending prompt information to an online communications software account, where the prompt information is used to indicate that the mobile terminal is in a Do Not Disturb mode.

In some embodiments of the present invention, the step, executed by the processor 61, of detecting an online status of a communications software account associated with the communication request initiating party and sending prompt information to an online communications software account is specifically:

searching, according to a preset mapping relationship, for a communications software account corresponding to the communication request initiating party;

detecting an online status and a preset priority of each communications software account if the communication request initiating party is corresponding to multiple communications software accounts; and sending the prompt information to a communications software account that is in an online state and has a highest priority.

In some embodiments of the present invention, the processor 61 is further configured to execute the following operations:

if the time interval is less than the preset threshold, proceeding to determine whether the communication request is an incoming call request; and if yes, generating a vibrating and/or ringtone alert; if not, skipping generating a vibrating and/or ringtone alert.

By implementing this embodiment of the present invention, a Do Not Disturb mode is set and activated on a mobile terminal, a time interval between a current communication time and a previous communication time of a communication initiating party is calculated, and whether the time interval is less than a preset threshold is determined according to the time interval. If yes, the Do Not Disturb mode set on the mobile terminal is bypassed, and a vibrating and/or ringtone alert is generated; if not, the mobile terminal is prohibited from generating a vibrating and/or ringtone alert, and prompt information is sent to a communications software account that is in an online state and corresponding to the communication request initiating party, to notify the communication request initiating party that the Do Not Disturb mode is activated on the mobile terminal, In this way, a problem in the prior art that important information from a communication request initiating party is missed after a Do Not Disturb mode is activated on a mobile terminal can be effectively solved.

Figure 9:
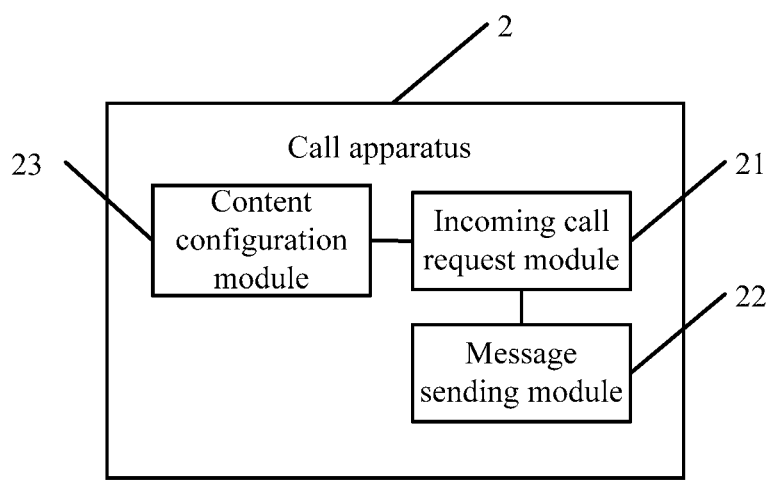
FIG. 9 is a schematic structural diagram of a call apparatus of a mobile terminal according to an embodiment of the present invention.
Figure 10:
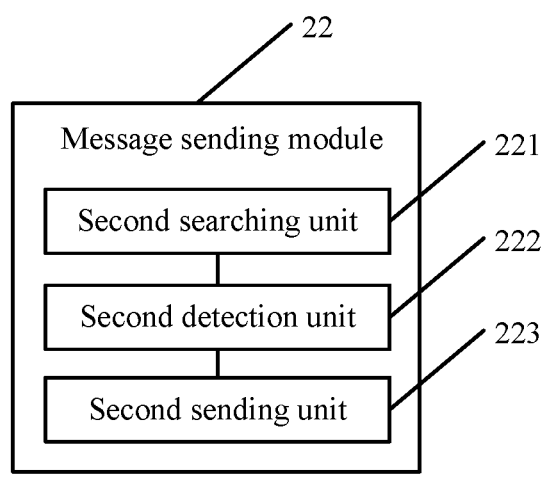
FIG. 10 is a schematic structural diagram of a message sending module in FIG. 9.

Referring to FIG. 9 and FIG. 10, FIG. 9 and FIG. 10 are schematic structural diagrams of a call apparatus of a mobile terminal according to an embodiment of the present invention. The call apparatus 2 includes a content configuration module 23, an incoming call request module 21, and a message sending module 22.

The content configuration module 23 is configured to preset content of the communication message.

The incoming call request module 21 is configured to initiate a call request to a mobile terminal of a called party.

The message sending module 22 is configured to: when it is detected that the mobile terminal of the called party rejects the call request, send a communication message to a communications software account that is in an online state and associated with the called party, so that the mobile terminal of the called party generates a vibrating and/or ringtone alert according to the communication message.

Further preferably, the message sending module 22 includes:

a second searching unit 221, configured to search, according to a preset mapping relationship, for a communications software account corresponding to the called party;

a second detection unit 222, configured to detect an online status and a preset priority of each communications software account if the called party is corresponding to multiple communications software accounts; and a second sending unit 223, configured to send the communication message to a communications software account that is in an online state and has a highest priority.

By implementing this embodiment of the present invention, a mobile terminal of a calling party initiates an incoming call request to a mobile terminal of a called party; and when it is detected that the mobile terminal of the called party does not process the incoming call request, sends a communication message to a communications software account associated with the called party, so that a Do Not Disturb mode set on the mobile terminal of the called party is bypassed according to the communication message, and a vibrating and/or ringtone alert is generated. In this way, important information from the calling party is not missed.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A mobile terminal control method, wherein the mobile terminal is in a Do Not Disturb mode, the method comprising:
   receiving a communication request initiated by a communication request initiating party;
   determining a time interval between a time when the communication request is received and a time when a previous communication request from the communication request initiating party is received;
   determining whether the time interval is greater than a preset threshold;
   skipping generating a vibrating and/or ringtone alert for the communication request when determining that the time interval is greater than the preset threshold;
   detecting an online status of a communications software account associated with the communication request initiating party when determining that the time interval is greater than the preset threshold;
   sending prompt information to the online communications software account for indicating that the mobile terminal is in the Do Not Disturb mode; and
   wherein the communication request and the previous communication request are two different communication types.

2. The method according to claim 1, wherein the communication request is an incoming call and the previous communication request is an SMS message.

3. The method according to claim 2, wherein detecting the online status of a communications software account associated with the communication request initiating party and sending prompt information to an online communications software account comprises:
   detecting an online status and a preset priority of each communications software account if the communication request initiating party corresponds to multiple communications software accounts; and
   sending the prompt information to a communications software account that corresponds to the communication request initiating party and that is in an online state and has a highest priority.

4. The method according to claim 1, wherein the prompt information further comprises a threshold set on the mobile terminal for indicating that the communication request initiating party can initiate a second communication request within the threshold, and wherein the communication request and the second communication request are the same communication types.

5. The method according to claim 4, wherein the second communication request is a SMS message.

6. The method according to claim 4, wherein the second communication request is an incoming call.

7. The method according to claim 4, wherein the prompt information indicates that a do not disturb mode has been activated.

8. A mobile terminal, comprising:
   a display;
   one or more processors; and
   a memory for storing instructions which, when executed by the one or more processors, cause the mobile computer to:
      receive a communication request initiated by a communication request initiating party,
      determine a time interval between a time when the communication request is received and a time when a previous communication request from the communication request initiating party is received,
      determine whether the time interval is greater than a preset threshold,
      skip generating a vibrating and/or ringtone alert for the communication request when determining that the time interval is greater than the preset threshold,
      detect an online status of a communications software account associated with the communication request initiating party when determining that the time interval is greater than the preset threshold,
      send prompt information to the online communications software account for indicating that the mobile terminal is in the Do Not Disturb mode, and
      wherein the communication request and the previous communication request are two different communication types.

9. The mobile terminal according to claim 8, wherein the communication request is an incoming call and the previous communication request is an SMS message.

10. The mobile terminal according to claim 9, wherein to detect the online status of a communications software account associated with the communication request initiating party and sending prompt information to the online communications software account, the instructions, when executed by the one or more processors, further cause the mobile computer to:
    detect an online status and a preset priority of each communications software account if the communication request initiating party corresponds to multiple communications software accounts; and
    send the prompt information to a communications software account that corresponds to the communication request initiating party and that is in an online state and has a highest priority.

11. The mobile terminal according to claim 9, wherein the prompt information further comprises a threshold set on the mobile terminal for indicating that the communication request initiating party can initiate a second communication request within the threshold, and wherein the communication request and the another communication request are the same communication types.

12. The mobile terminal according to claim 11, wherein the second communication request is a SMS message.

13. The mobile terminal according to claim 11, wherein the second communication request is an incoming call.

14. The mobile terminal according to claim 11, wherein the prompt information indicates that a do not disturb mode has been activated.

* * * * *